United States Patent [19]
Bagnulo

[11] 3,853,768
[45] Dec. 10, 1974

[54] SKIMMING APPARATUS

[76] Inventor: Luigi Bagnulo, Via A. Volta, 18, Milan, Italy

[22] Filed: Jan. 10, 1973

[21] Appl. No.: 322,503

[30] Foreign Application Priority Data
Jan. 19, 1972 Italy .................... 19526/72

[52] U.S. Cl. .................... 210/242, 210/DIG. 21
[51] Int. Cl. ............................ E02b 15/04
[58] Field of Search . 210/65, 85, 169, 242, DIG. 21

[56] References Cited
UNITED STATES PATENTS

| | | | |
|---|---|---|---|
| 3,534,859 | 10/1970 | Amero et al. ..................... | 210/242 |
| 3,635,342 | 1/1972 | Mourlon et al. ................... | 210/242 |
| 3,638,796 | 2/1972 | Graves et al. ..................... | 210/170 |
| 3,661,260 | 5/1972 | Koga et al. ........................ | 210/83 |
| 3,722,689 | 3/1973 | Markel et al. ..................... | 210/242 |
| 3,741,391 | 6/1973 | Donsbach .................... | 210/DIG. 21 |

*Primary Examiner*—Theodore A. Granger

[57] ABSTRACT

A skimming apparatus comprises means defining a chamber adapted to be partly submerged in a body of liquid and having an upper and lower zone. Admitting means for admitting liquid into the lower zone of the chamber is provided and sufficient liquid is maintained in the chamber so as to allow substances floating on the admitted liquid to rise and float inside the upper zone of the chamber. Discharging means discharges the skimmed liquid at a lower portion of the lower zone of the chamber and conveying means conveys the floating substances from the chamber.

12 Claims, 1 Drawing Figure

PATENTED DEC 10 1974　　3,853,768
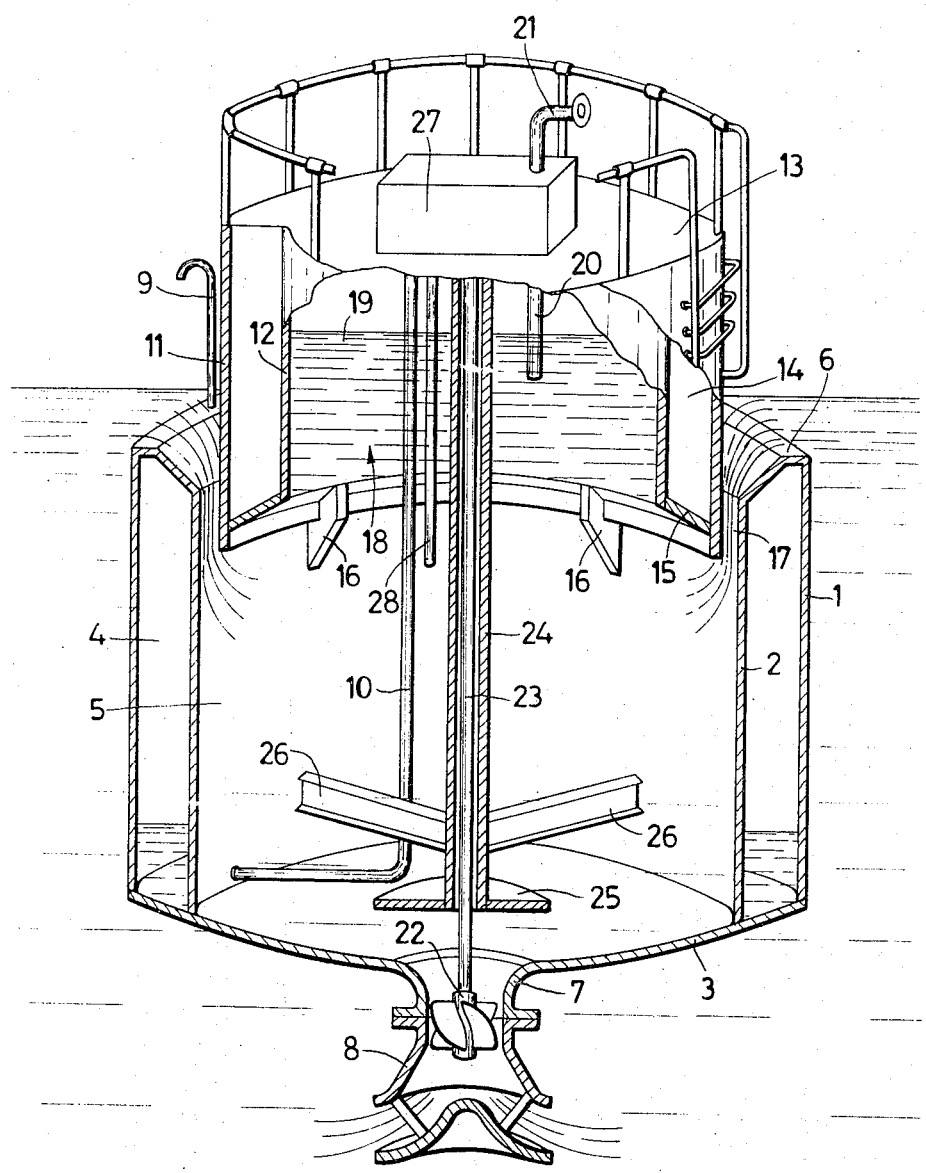

SKIMMING APPARATUS

BACKGROUND OF THE INVENTION

The invention relates generally to an apparatus for skimming off surface-floating subtances from liquids. The apparatus is particularly well adapted for the removal of petroliferous products and pollutants from marine and inland waters.

The elimination of petroliferous products polluting marine and inland waters is a problem which is of particular relevance at this time. Several approaches have been tried in attempting to solve this problem. In the chemical approach, suitable substances are utilized which are capable of either absorbing the petroliferous products or of combining with them in such a manner that the petroliferous products can subsequently precipitate out or be dissolved in the waters. In the mechanical approach, one of the methods which has been used involves the provision of suitable floating weirs through which the petroliferous products, mixed with water, are drawn by means of pumps. This mixture is conveyed into barges or the like wherein separation of the petroliferous products from the water takes place by decantation.

However, these methods have certain disadvantages. The chemical methods are very costly and do not allow the petroliferous products to be reclaimed. The decantation methods, on the other hand, require large barges or the like for the collection of the mixture of petroliferous products and water and, furthermore, the petroliferous products come emulsified with the water while being pumped which increases the difficulty of subsequent separation.

SUMMARY OF THE INVENTION

Accordingly, it is an object of the invention to overcome the disadvantages of the prior art.

More particularly, it is an object of the invention to provide an apparatus whereby separation of surface-floating substances from liquids may be effected in a single operation.

A further object of the invention is to provide an apparatus whereby separation of surface-floating substances from liquid may be accomplished rapidly yet be virtually complete.

Another object of the invention is to provide an apparatus whereby surface-floating substances may be economically recovered.

In accordance with these and other objects, the invention provides a skimming apparatus for skimming surface-floating substances from liquid, which comprises means defining a chamber adapted to be partly submerged in a body of liquid and having an upper and lower zone. Admitting means is provided for admitting liquid into the lower zone and the liquid in the chamber is maintained at a height sufficient so as to allow substances floating on the admitted liquid to rise into and float inside the upper zone. Discharging means discharges the skimmed liquid at a lower portion of the lower zone and conveying means conveys the floating substances from the chamber.

A method of skimming off surface-floating substances from liquids comprises the steps of admitting liquid to be skimmed into a lower zone of a chamber and maintaining the liquid in the chamber at a height sufficient so as to allow substances floating on the admitted liquid to rise into and float inside an upper zone of the chamber. Skimmed liquid is discharged at a lower portion of the lower zone and the floating substances are conveyed from the chamber.

It will be apparent that the apparatus and method of the invention are equally applicable whether the surface-floating substances are solids, semi-solids or liquids.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a perspective view in axial section of one form of a skimming apparatus according to the invention.

DESCRIPTION OF THE PREFERRED EMBODIMENTS

Referring now to the single FIGURE, it will be seen that the form of the skimming apparatus illustrated comprises a lower tubular portion including concentric cylindrical plates or wall means 1 and 2 which are fast with a convex base or transverse wall 3 at their lower ends. A first watertight peripheral chamber or compartment 4 is thus formed between wall means 1 and 2 in this manner a suitable first float or buoyancy element is created. A second central or chamber portion 5 for the collection and decantation of surface-floating substances is defined by the inner surface of wall means 2. Float compartment or element 4 is sealed at the top, i.e., in the region of the upper portions of wall means 1 and 2, by a substantially annular overflow cover or upper surface portion 6 which may be either flat or so shaped as to facilitate the entry of surface-floating substances to be collected or skimmed from the liquid into chamber portion 5. The volume of compartment 4 is such that cover 6 may always be maintained at a level higher than the surface of the body of liquid in which the skimming apparatus is accomodated when the apparatus is not operative. As will be seen more clearly later, provision is made for submerging cover 6 to a predetermined depth by weighting the apparatus through the introduction of liquid into compartment 4. A discharge fitting 7 is secured to base 3 and communicates with an opening therein. When forced discharge of liquid from chamber portion 5 is to be effected through discharge pump means which is integral or of one piece with the apparatus, such as helicopump 22, a diffuser is connected to discharge fitting 7 so as to communicate therewith and with the surrounding body of liquid. On the other hand, when external pump means (not shown) separate from or independent of the apparatus is used for the forced discharge of liquid from chamber portion 5, a suitable flexible hose or hose means (not shown) is connected with discharge fitting 7 so as to communicate therewith and with the surrounding body of liquid.

A tube or tube means 10 is secured to the inner surface of wall means 2 so as to communicate with compartment 4 while a tube or air passage means is provided on cover 6 and also communicates with compartment 4. Tube means 10 serves for the transfer of liquid between a source of liquid and compartment 4 whereas air passage means 9 permits air to escape from compartment 4 when liquid is being introduced therein and permits air to enter compartment 4 when liquid is being removed therefrom.

The upper tubular portion of the apparatus includes concentric cylindrical plates or wall means 11 and 12. The top cover or transverse wall 13 provided at the upper regions of wall means 11 and 12 serves as a walking surface on the apparatus. The substantially annular cylindrical chamber or compartment 14 defined by wall means 11 and 12 is sealed in its upper region by the peripheral zone or region of cover 13 and in its lower region by an annular base or lower surface 15. Thus, compartment 14 is watertight and forms a second float or buoyancy element. The upper tubular portion of the apparatus, which has an outer diameter smaller than the inner diameter of the lower tubular portion of the apparatus, is inserted into the latter to a predetermined depth so as to be encircled thereby and the two overlapping tubular portions are then made fast with one another through suitable connecting brackets or connecting means 16. An annular conduit or a gap 17 is formed between the outer wall of the upper tubular portion and the inner wall of the lower tubular portion and serves as admitting means for introduction of liquid into the apparatus. Surface-floating substances and liquid can then pass over cover 6, through gap 17 and into the decantation chamber formed by lower chamber portion or lower zone 5 and upper chamber portion or upper zone 18. In decantation chamber 5, 18, the surface-floating substances separate from the liquid in the sense that they rise into upper chamber portion 18 and accumulate in the upper region 19 thereof where they float on top of the liquid accommodated in chamber 5, 18. Skimmed liquid is forcibly expelled at the lower portion of lower chamber portion 5 and is drawn through discharge fitting 7 by suitable pump means. On the other hand, the surface-floating subtances accumulated in upper region 19 are pumped into dip-tube or dip-tube means 20 by a delivery pump or delivery pump means (not shown) and conveyed through tube or conduit means 21 to receiving means (not shown).

Discharge pump means 22, which forcibly expels skimmed liquid from lower chamber portion 5, is actuated by a suitable drive apparatus or drive means (not shown) through a shaft 23 accomodated within a guard-tube 24. The lower end of guard-tube 24 is provided with a water-flow conveyor flange 25. Guard-tube 24 is made fast with wall means 2 through the use of suitable brackets 26.

The group of driving apparatus or driving means shown generally at 27 comprises a variable speed motor for actuation of discharge pump means 22, a transfer pump or transfer pump means for the transfer of liquid to and from compartment 4 through tube means 10 and tube means 28, and delivery pump means for removal of surface-floating substances from the upper region 19 of chamber portion 18 through dip-tube means 20 and conduit means 21.

It will be clear from the FIGURE that the upper and lower tubular portions of the apparatus together are means defining a chamber 5, 18 adapted to be partly submerged in a body of liquid and including an upper zone 18 and a lower zone 5. Chamber 5, 18 has a bottom formed by base 3.

Operation of the skimming apparatus is simple. When discharge pump means 22 is inoperative, the apparatus floats and the liquid accommodated in lower chamber portion 5 remains static. Cover 6, which may be provided with a grid extending across the inlet gap in order to prevent extraneous bodies from entering the apparatus, is normally above the surface of the liquid in which the apparatus floats.

By actuating the transfer pump means, liquid is drawn into dip-tube means 28 and pumped through tube means 10 into compartment 4 until cover 6 is at the desired depth below the surface of the body of liquid. Thus, the transfer pump means, dip-tube means 28, tube means 10 and compartment 4 together comprise flotation means for the skimming apparatus. When cover 6 is at the desired depth, the motor of discharge pump means 22 is started so as to discharge liquid from lower chamber portion 5 through discharge fitting 7 and diffuser 8 which action causes a fresh mixture of surface-floating substances and liquid to flow over cover 6, through gap 17 and into lower chamber portion 5. The operating speed of discharge pump means 22 is then gradually increased until the speed at which the mixture is admitted into lower chamber portion 5 does not exceed the speed at which the surface-floating substances rise in chamber 5, 18. In this way, the surface-floating substances will accumulate and float on the liquid in the upper region 19 of upper chamber portion 18. From there, the surface-floating substances will be drawn into dip-tube means 20 and through conduit means 21 by delivery pump means. The surface-floating substances are then discharged from conduit means 21 into suitable receiving or reclaiming means (not shown). If the delivery pump means should stop for any reason, gap 17 will act as a hydraulic safety device and will prevent escape of the surface-floating substances accumulated in the upper region 19 of upper chamber portion 18.

The same circuit as used for introducing liquid into compartment 4 is used for discharging liquid from compartment 4, the liquid in compartment 4 being drawn through tube means 10 into tube means 28 by the transfer pump means. This liquid is then discharged from tube means 28 into lower chamber portion 5. It is to be understood that the flotation or ballasting may be effected in any other suitable manner using any suitable means.

If the skimming apparatus is to be employed in a fixed position as, for example, in ports, harbors, canals or in the vicinity of wharves, or, if the apparatus is so located that it need not be self-contained, then the apparatus need not include the discharge pump means 22 or the delivery pump means (not shown) through a suitable flexible hose or hose means which will then replace the diffuser 8 communicating with discharge fittiing 7. The same may also be done for the conveying of the surface-floatiing substances from upper chamber portion 18 to receiving means. pump means for conveying of the surface-floating substances. In such cases, the discharge of liquid from lower chamber portion 5 may be effected by suitably positioned external pump means (not shown) through a suitable flexible hose or hose means which will then replace the diffuser 8 communicating with discharge fitting 7. The same may also be done for the conveying of the surface-floating substances from upper chamber portion 18 to receiving means.

It will be understood that motors of any known type may be used for the actuation of helicopump or discharge pump means 22 as well as for all other necessary pumps and that all pumps may be remote-controlled. It will also be clear that the functioning of the skimming apparatus may be automated and that its shape and dimensions as well as other of its constructional details may be varied without altering the novel characteristics thereof. The great stability of the skimming apparatus, resulting from its form and constructional characteristics, allows the apparatus to be used in rough seas or waters as well as in calm seas or waters.

It will be understood that each of the elements described above, or two or more together, may also find a useful application in other types of constructions and applications differing from the types described above.

While the invention has been illustrated and described as embodied in a skimming apparatus and method, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A skimming apparatus for skimming off surface-floating substances from liquids, comprising means defining a chamber adapted to be at least partially submerged in a body of liquid, said chamber-defining means including a lower wall portion which defines a lower zone of said chamber for accommodating liquid to be skimmed, and an upper wall portion which defines an upper zone of said chamber for accommodating substances floating on the liquid in said lower zone, said lower and upper wall portions overlapping one another, and said upper wall portion being located within the confines of said lower wall portion in the region of overlap and defining with said lower wall portion a gap in said region; admitting means for admitting liquid to be skimmed into said lower zone and being at least in part constituted by said gap; flotation and ballast means for regulating the extent to which said wall portions are submerged in the surrounding body of liquid and thereby the level of said gap with respect to the surface of the surrounding body of liquid, said flotation and ballast means comprising a liquid-tight compartment in said lower wall portion; discharging means for discharging skimmed liquid from said lower zone; and conveying means for conveying floating substances from said upper zone.

2. A skimming apparatus as defined in claim 1, wherein said wall portions are fast with one another.

3. A skimming apparatus as defined in claim 1, further comprising, tube means communicating with a source of liquid at one end and with said compartment at another end, transfer pump means for effecting transfer of liquid between said source and said compartment, and air passage means for escape of air from said compartment upon introduction of liquid thereto and for entry of air into said compartment upon removal of liquid therefrom.

4. A skimming apparatus as defined in claim 3, wherein said other end of said tube means communicates with said lower zone so as to permit transfer of liquid between said lower zone and said compartment.

5. A skimming apparatus as defined in claim 1, wherein said discharging means comprises an opening in a bottom of said chamber, a discharge fitting communicating with said opening, a diffuser communicating with said discharge fitting and with the surrounding body of liquid, and discharge pump means accomodated in said discharge fitting for effecting discharge of liquid from said chamber through said diffuser and into the surrounding body of liquid.

6. A skimming apparatus as defined in claim 1, wherein said conveying means comprises conduit means having one end communicating with said upper zone and another end communicating with receiving means, and delivery pump means for conveying the floating substances from said upper zone through said conduit means and into said receiving means.

7. A skimming apparatus as defined in claim 1, wherein said lower and upper wall portions are of substantially circular cross-sectional configuration.

8. A skimming apparatus as defined in claim 1, wherein said gap is complete in circumferential direction of said wall portions.

9. A skimming apparatus as defined in claim 1, wherein said discharging means is operative for discharging skimmed liquid at a lower portion of said lower zone.

10. A skimming apparatus as defined in claim 1, wherein said flotation and ballasting means further comprises an additional liquid-tight compartment defined by said upper wall portion.

11. A skimming apparatus as defined in claim 1, said lower wall portion having an upper end section provided with a surface portion facing inwardly of said chamber; and wherein said surface portion is of upwardly and outwardly flaring configuration so as to facilitate the flow of liquid into said gap.

12. A skimming apparatus as defined in claim 1, wherein said upper wall portion extends upwardly of said lower wall portion.

* * * * *